(12) United States Patent
Beardsley et al.

(10) Patent No.: US 9,573,701 B2
(45) Date of Patent: Feb. 21, 2017

(54) ROBUST AND AUTONOMOUS DOCKING AND RECHARGING OF QUADROTORS

(71) Applicant: DISNEY ENTERPRISES, INC., Burbank, CA (US)

(72) Inventors: Paul A. Beardsley, Zurich (CH); Michael Eriksson, Pully (CH); Javier Alonso-Mora, Zurich (CH); Joern Rehder, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 198 days.

(21) Appl. No.: 14/452,819

(22) Filed: Aug. 6, 2014

(65) Prior Publication Data

US 2016/0039541 A1 Feb. 11, 2016

(51) Int. Cl.
*B64F 1/36* (2006.01)
*B60L 11/18* (2006.01)
(Continued)

(52) U.S. Cl.
CPC ............ *B64F 1/362* (2013.01); *B60L 11/1816* (2013.01); *B60L 11/1818* (2013.01);
(Continued)

(58) Field of Classification Search
CPC ........ B64F 1/06; B64F 1/22; B64C 2201/146; B64C 39/024; B64C 2201/127; B64C 2201/182; G05D 1/101; G05D 1/0094; G08G 5/003; G08G 5/0043
(Continued)

(56) References Cited

U.S. PATENT DOCUMENTS

| 5,687,930 A | 11/1997 | Wagner et al. |
| 2003/0015041 A1* | 1/2003 | Bruns ...................... G01G 3/10 73/849 |

(Continued)

FOREIGN PATENT DOCUMENTS

| DE | 10-2007-003458 A1 | 7/2008 |
| EP | 2540623 A2 | 1/2013 |

(Continued)

OTHER PUBLICATIONS

International Search Report for International Application No. PCT/US2015/043447, dated Oct. 22, 2015.

*Primary Examiner* — Behrang Badii
*Assistant Examiner* — Sanjeev Malhotra
(74) *Attorney, Agent, or Firm* — Marsh Fischmann & Breyfogle LLP; Kent A. Lembke

(57) ABSTRACT

A method of docking and recharging using a base station and a station-mating frame on the multicopter. The base station includes an upward-facing camera that is used by a docking controller to detect the presence, position, and orientation of a frame, with infrared light-emitting diodes arranged in a predefined pattern. The controller of the base station acts to emit wireless signals to the multicopter to guide the multicopter with its station-mating frame to a predefined position above the base station. The controller transmits a wireless signal to the multicopter to reduce thrust, and the multicopter lowers itself onto a sloped receiving surface that may be arranged in a crown pattern to provide passive gravity-driven centering, which causes the station-mating frame to slide to a lowest vertical point of the receiving assembly. A locking mechanism engages to lock the frame in place and provide electrical contact for recharging.

9 Claims, 10 Drawing Sheets

(51) Int. Cl.
*B64C 39/02* (2006.01)
*G05D 1/00* (2006.01)
*G05D 1/04* (2006.01)

(52) U.S. Cl.
CPC ....... *B60L 11/1824* (2013.01); *B60L 11/1833* (2013.01); *B60L 11/1835* (2013.01); *B60L 11/1846* (2013.01); *B64C 39/024* (2013.01); *G05D 1/0011* (2013.01); *G05D 1/0088* (2013.01); *G05D 1/042* (2013.01); *B60L 2200/10* (2013.01); *B60L 2230/10* (2013.01); *B64C 2201/024* (2013.01); *B64C 2201/042* (2013.01); *B64C 2201/066* (2013.01); *B64C 2201/141* (2013.01); *B64C 2201/146* (2013.01); *B64C 2201/182* (2013.01); *Y02T 10/7005* (2013.01); *Y02T 10/7088* (2013.01); *Y02T 90/121* (2013.01); *Y02T 90/125* (2013.01); *Y02T 90/14* (2013.01)

(58) Field of Classification Search
USPC ........ 701/2, 3, 23; 73/849; 403/119; 439/66; 244/114 R
See application file for complete search history.

(56) References Cited

U.S. PATENT DOCUMENTS

| | | | |
|---|---|---|---|
| 2004/0167682 A1 | 8/2004 | Beck et al. | |
| 2007/0025809 A1* | 2/2007 | Lee | B64F 1/06 403/119 |
| 2015/0111400 A1* | 4/2015 | Hashiguchi | H01R 13/2428 439/66 |
| 2015/0134143 A1* | 5/2015 | Willenborg | G05D 1/0094 701/2 |
| 2015/0266575 A1* | 9/2015 | Borko | B64C 39/024 701/3 |
| 2015/0353206 A1* | 12/2015 | Wang | B64F 1/00 244/114 R |
| 2016/0035224 A1* | 2/2016 | Yang | H04B 7/18506 701/23 |

FOREIGN PATENT DOCUMENTS

| | | |
|---|---|---|
| FR | 2941922 A1 | 8/2010 |
| WO | 2015108588 A2 | 7/2015 |

* cited by examiner

ROBUST AND AUTONOMOUS DOCKING AND RECHARGING OF QUADROTORS

BACKGROUND

1. Field of the Description

The present invention relates, in general, to unmanned aerial vehicles (UAVs) such as quadrotors, and, more particularly, to a docking and charging station adapted to be autonomous and a method of docking and charging UAVs without human intervention (e.g., in an autonomous manner).

2. Relevant Background

The research on autonomous miniature flying robots has intensified considerably in recent years due in large part to civil and military interest in unmanned aerial vehicles (UAVs) including multicopters (e.g., quadrotors). To date, the capabilities of UAVs surpassed by far human-controlled flight because powerful feedback control loops allow computers to control the UAVs with far greater precision, speed, and reliability. The control techniques allow the UAVs to be autonomous in large part, but human intervention has not yet been completely removed as each UAV has a major limiting characteristic in the form of the need for electrical power to continue to operate. For example, many UAVs may only be able to fly for 10 to 20 minutes without a replacement or recharge of onboard batteries.

Hence, an ongoing engineering challenge is that UAVs (and are other mobile robots) are constrained in their long term functionality due to a limited onboard power supply. Typically, rechargeable batteries are utilized to provide the onboard electrical power, and such batteries are chosen to be lightweight such that they may only provide a few minutes to an hour of peak usage before recharging is necessary. Recharging requires that the UAV be taken offline (e.g., landing) and having the batteries recharged or replaced via human intervention. Presently, the UAV lands on the ground in a large open space such as a vacant lot or field, and a human operator manually takes out a battery from the UAV for recharging and replaces it with a previously charged battery.

Such human intervention is unacceptable in many existing or planned operating environments where long term autonomous capabilities are desired. As a result, there remains a need for better ways to recharge onboard power supplies such as batteries on UAVs such as the commonly used and prevalent quadrotors.

SUMMARY

Briefly, a method of docking and recharging a UAV such as a multicopter (e.g., a quadrotor) using a specially-designed docking station is described herein. The method and docking (or base) station (or docking system including the docking station) are adapted to address the problem of providing a base station for a multicopter so that the multicopter can take off from the base station, land in the base station, and recharge, with all three of these functions being performed autonomously.

There were several design parameters or ongoing demands that led to the development of the method and docking system including: (1) a desire to have a base station such that a quadrotor can deploy for a mission, return to the base station and recharge with minimal or no human intervention (and it was understood by the inventors that aerial vehicles like quadrotors require safe handling by skilled personnel or controllers especially on take-off and landing when they are close to people such that the base station should be designed to enable autonomous take-off and landing in protected areas with no need for nearby personnel); (2) a desire to have a base station that readily adapts to or can be used by differently designed multicopters as it was recognized by the inventors that it would be time consuming and expensive to modify the base station and/or multicopter (e.g., its added components enabling docking and/or recharging) for each new model or design (note, that the term "reuseable" is used to mean that the base station can be used flexibly with differently designed or different models of multicopters rather than with just one specific design/model); and (3) a desire to have a base station that is compact and portable, e.g., the base station can be mounted in some implementations on a post (e.g., a lamp post or the like) or a raised platform.

In some embodiments, a docking and recharging system is provided that can be considered a two-part system. The first part is a base or docking station, and the second part is a station-mating frame that is attached to the underside of a multicopter. The station-mating frame is reuseable across different multicopters to allow different models or designs of multicopters to land and take off from a base station (including, in some cases, being locked into a charging position in the station upon landing) and to recharge at the base station.

The method of docking and recharging using the base station and the station-mating frame on the multicopter takes place through the following stages or processes: (1) the base station includes an upward-facing camera that is used by a docking controller to detect the presence of a frame (e.g., the frame may have a plurality of infrared (IR) light-emitting diodes (LEDs) arranged in a predefined pattern) and to compute the position of the frame and the multicopter (e.g., its X-Y position relative to the docking station and the forward portion of the multicopter), and this stage may include the controller of the base station then acting to emit wireless signals (a first set of control signals) to the multicopter to guide the multicopter with its station-mating frame to a predefined position over or above the base station; (2) once the frame and multicopter are in the predefined position (or range of positions) above the base station, the controller in the base station then transmits or emits a wireless signal (a second set of position signals or a second control signal) to the multicopter to cause the multicopter to reduce thrust, and this stage then includes the multicopter lowering itself onto or into the base station (onto the receiving surfaces or components of the station, which may be labeled a "reception unit" or "receiving assembly"), and the base station is configured such that passive gravity-driven centering (provided by sloping receiving surface or edges of the station's sidewalls of the receiving assembly) causes the station-mating frame to slide to a lower (or even lowest) vertical point of the receiving assembly (e.g., frame arms fall into receiving slots or grooves provided in the sidewalls); (3) once the frame has fallen to the lowest point of the receiving assembly (e.g., into grooves/slots in the slanted or angled sidewalls), a locking mechanism is engaged that locks (e.g., limits vertical and side-to-side movement of) the frame in place and also retains or even enhances electrical contact (formed when the frame fell into the grooves or slots) for recharging; and (4) with the frame locked in a recharging position, recharging proceeds with the frame including incoming charging contacts that engage (abut or are in proximity) charging contacts on the base station's receiving assembly (note, the frame also includes outgoing charging contacts that are attached to the multicopter's battery to allow recharging to proceed).

More particularly, a system is provided for autonomous docking and charging of an unmanned aerial vehicle (UAV) such as a quadrotor or other multicopter. The system includes a docking station including a vertical sidewall extending about a perimeter of an open space and having a plurality of sloped receiving surfaces arranged in a pattern of alternating peaks and valleys. The system also includes a station-mating frame affixed to the UAV that includes a first linear arm and a second linear arm. In some cases, the first and second linear arms are coplanar (e.g., their lower surfaces are generally coplanar) and may also be arranged in some cases to be orthogonal (while the arms are non-orthogonal in other implementations). The first and second linear arms each have a length greater than an outer dimension of the perimeter of the open space defined by the vertical sidewall (e.g., an arm length that is 10 to 50 percent of a diameter or other outer dimension of the shape made by the receiving surfaces on top of the vertical walls).

In some implementations, the sloped receiving surfaces are each provided at a slope angle of at least 15 degrees (e.g., in the range of 15 to 45 degrees or the like), whereby the UAV with the station-mating frame slides under gravity into the valleys when the first and second linear arms contact the sloped receiving surfaces. In these cases, a charging contact is provided on at least one of the first and second linear arms and a charging contact, linked to an electrical power supply, is provided in at least one of the valleys of the sloped receiving surfaces, whereby the charging contacts have an electrical connection when the first and second linear arms are received in the valleys of the sloped receiving surfaces. The system may include a locking mechanism in the docking station adapted for retaining the first and second linear arms in the valleys of the sloped receiving surfaces and for urging the charging contact on the at least one of the first and second linear arms into contact with the charging contact in the at least one of the valleys of the sloped receiving surfaces. Recessed grooves can be provided at lowest points in the valleys for receiving the first and second linear arms such that the locking mechanism is actuable or operable (e.g., in response to a control signal from the docking station controller when a sensor indicates the presence of a linear arm) to retain the first and second linear arms within the recessed grooves. The charging contact in the at least one of the valleys of the sloped receiving surfaces can be provided in the recessed grooves.

In some embodiments, the docking station includes a digital or other camera facing outward from the open space enclosed by the vertical sidewalls. The station-mating frame may include a plurality of light sources arranged on the first and second linear arms in a pattern (e.g., an asymmetric pattern, a symmetric pattern but with a particular arrangement of colored lights, symmetric but at least one strobing a temporal code, and/or the like), and the docking station may include a controller processing frames captured by the digital camera to identify the station-mating frame based on the asymmetric pattern of the light sources, and, in response, to communicate landing control signals to the UAV. The plurality of light sources can be mounted in spaced apart and crossing lines on the first and second linear arms to allow the controller to process the frames with projective invariance.

In some implementations, the plurality of light sources each may include an infrared (IR) light emitting diodes (LEDs) (e.g., an 880 nm or greater LED), and the digital camera can be a monochromatic or other camera with an IR filter filtering out ambient light (e.g., to filter out most of the received daylight from the Sun, which allows use of an upward-facing camera but still detect light from IR light sources, an IR filter may be used that filters out the IR light for a part of the spectrum where sunlight drops to a minimum so that the processed light is in a spectrum where sunlight is least likely to interfere with detecting the IR LEDs, and, further, a dark circular backing may be placed behind the IR light source so that it is distinct from the bright sky (or bright surrounding or ambient light above the docking station).

The landing control signals can include a pose of the UAV determined, by the controller, based on an orientation of the asymmetric pattern in the captured frames and can include a signal to reduce thrust when the UAV is tracked to a pre-landing position above the sloped receiving surfaces of the vertical walls (e.g., the UAV may be a quadrotor and the signal may turn off the motors or stop rotation of the rotors).

DETAILED DESCRIPTION

Briefly, the present description is directed toward robust autonomous docking and recharging of UAVs such as quadrotors. The docking and charging systems described use a ground-based monochromatic camera combined with a vision system to determine the exact position of a quadrotor in 3-dimensional (3D) space relative to a base station, and this avoids the need for heavy onboard sensors and cameras on the quadrotor. The quadrotor payload is limited, in most cases, to a station-mating frame that is used for visual tracking via a set of IR LEDs or other light sources arranged in a predefined (and recognizable) pattern on crossed arms of the frame. The station-mating frame is also used for recharging of one or more batteries on the quadrotor. To this end, the frame contains charging contacts for mating with contacts in the base station and leads/lines are run through the frame (such as in the hollow arms) to a contact or connector electrically linking the charging contacts with the quadrotor's rechargeable battery.

In some implementations, the UAV is a quadrotor with onboard processing and autopilot capabilities, and the quadrotor is fitted with a detachable station-mating frame. The frame may be formed of a plastic, a carbon, or the like to be lightweight yet strong and rigid. The frame includes an asymmetrical configuration (predefined pattern) of light sources (e.g., IR LEDs) that are arranged to face downward (or away from the quadrotor) and also a number of exposed charging leads. The dock or base station (or its receiving assembly or reception unit) is composed of a specifically-profiled sidewall defining a frame-receiving surface that is configured to passively correct landing errors such as with vertical sidewalls with upper or receiving edges/sides alternating between peaks and valleys (e.g., crown shaped sidewall), with grooves/slots (or lowest points) at the valleys between adjacent sidewall pairs for receiving the crossed arms of the frame as the quadrotor and frame are gravity fed or forced to slide down the sloped receiving edges/sides, and with an outer dimension (e.g., generally a diameter) that is less than a length of the crossed arms such that the quadrotor does not have to be perfectly centered when it lands/falls onto the receiving edges/sides of the base station. An upwards facing monochromatic camera with an IR-filter, for example, is coupled to a processing unit running a vision algorithm that acts to recognize when the predefined pattern is provided by IR LEDs, which indicates the presence of a frame, and to then calculate the pose and position of the UAV and its frame in 3D space before transmitting control signals to the UAV (signals instructing the UAV to move to pre-landing position over the base station).

Figure 1:
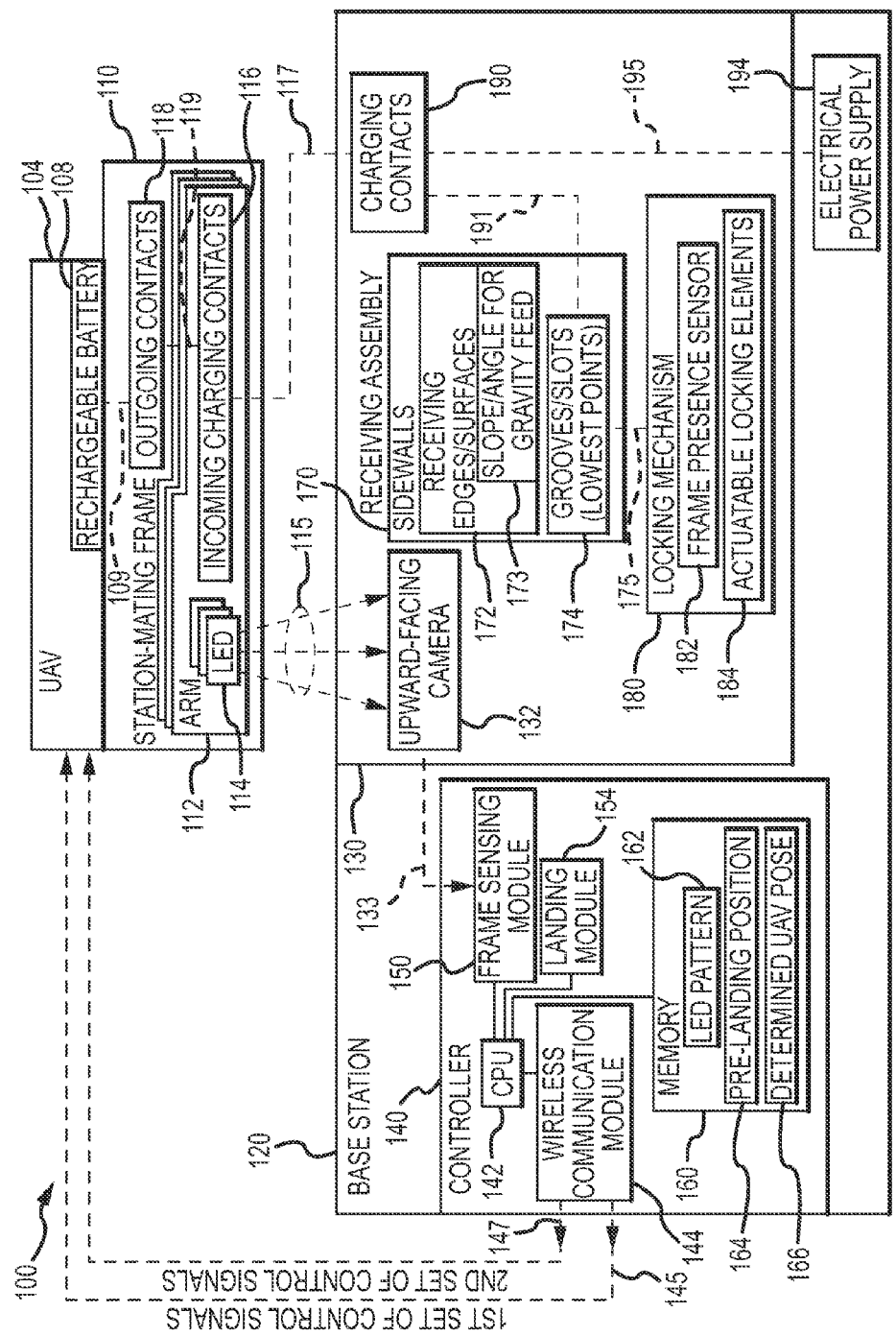
FIG. 1 is functional block diagram of a docking and charging system showing use of a station-mating frame attached to a UAV (e.g., a quadrotor) in combination with a base or docking station to achieve autonomous docking and charging of the UAV's battery.

FIG. 1 is functional block diagram of a docking and charging system 100 showing use of a station-mating frame 110 attached to a UAV 104 in combination with a base or docking station 120 to achieve autonomous docking and charging of the UAV's battery 108. The UAV 104 may be a multicopter such as a conventional and commonly-utilized quadrotor with one (or more) rechargeable battery 108.

Significantly, the system 100 includes a station-mating frame 110 attached to the bottom of the UAV 104 (such as onto a commonly provided center mount of a quadrotor or the like). The frame 110 includes a set of arms 112 such as a pair of linear beams or arms arranged to be orthogonal to each other and parallel to rotor-support arms of a quadrotor (when the frame 110 is coupled with the UAV 104). Note, though, that the beams or arms do not have to arranged to be parallel to the rotor-support arms, and, in some embodiments, the beams or arms are not orthogonal to each other with the illustrated arrangement only being one useful configuration (e.g., to limit aerodynamic effects of the frame 110 on the UAV 104). For example, in the case of applying the frame concept to a hexacopter, the alignment may not be perfect as shown in FIG. 1, but the overall operations taught herein would not be effected (or only minimally effected). The frame 110 is configured to be lightweight, and these arms 112 may be hollow plastic (or other material) arms that extend out from a center line of the UAV 104 a predefined distance. For example, each of the arms 112 may have an overall length (as measured tip-to-tip and an arm 112 may be a single or multi-piece unit) that is some fraction greater than a diameter (or outer dimension) of the opening defined by the sidewalls 170 of the receiving assembly (or reception unit) 130 of the base station such as 10 to 30 percent greater aim length than outer sidewall-defined dimension to avoid the arms 112 "missing" the receiving edges/surfaces 172 of the sidewalls 170 when a UAV 104 drops onto the receiving assembly 130.

Each arm 112 includes one or more light sources (e.g., IR LEDs) 114 that are downward facing (i.e., face away from the UAV) and operated to emit light 115. The light sources 114 are arranged in a pattern (e.g., see pattern 162 stored in memory 160 of the base station controller 140) that can be recognized by the base station 120 and used also to determine the pose of the UAV 104 relative to the receiving assembly 130 (e.g., which direction the front portion of the UAV 104 is facing and so on). For example, LEDs 114 of a certain number and spacing may be provided on each portion of an arm 112 extending out from center line of the UAV 104 and, coinciding, center line of the frame 110, with a different number and/or spacing provided on at least one of these portions to allow the controller 140, such as via the frame sensing module 150 to determine the UAV pose as shown stored at 166 (including its orientation relative to the receiving assembly 130).

Each arm 112 also includes one or more incoming charging contact 116 that is connected as shown at 119 to an outgoing contact(s) 118 which is electrically connected as shown at 109 to the rechargeable battery 108 of the UAV 104. When the UAV 104 lands on the base station 120, the arms 112 are received in grooves/slots (or lowest points) 174 of the receiving assembly 130, and the incoming charging contacts 116 are positioned on the arms 112 such that the contacts 116 mate (abut or nearly abut) charging contacts 190 of the receiving assembly 130, which may be provided within or as part of the grooves/slots 174 of the sidewalls 170 or proximate to such grooves/slots 174 (e.g., in the lowest point of each groove or slot 174 there may be a charging contact 190). The connecting wire/lead 119 from the incoming charging contact 116 to the outgoing contact(s) 118 may be provided within the hollow body of the arms 112 (e.g., with the outgoing contact provided in a center body or element of the frame 110 where the arms 112 cross each other).

As shown, the base station 120 includes a receiving assembly or reception unit 130 with an upward-facing camera 132 (e.g., a monochromatic camera), which may be centrally located within the interior space defined by the vertical or substantially vertical sidewalls 170. The upward-facing camera 132 is used to receive light from above the receiving assembly 130 including light from the light sources 114 on the arms 112 of the frame 110. The digital image information 133 is passed to the base station controller 140 for processing. Particularly, the base station 120 includes a controller 140 that may take the form of a special-purpose computer with a processor 142 managing operation of a wireless communications module 144, for managing and accessing memory (e.g., computer-readable media) 160, and for executing code or instructions (e.g., software programs) to provide a frame sensing module 150 and a landing module 154, which act together to provide docking and charging functions described herein.

Particularly, the frame sensing module 150 processes the camera data (images) 133 to determine when a predefined light pattern (or LED pattern) 162 is in the image captured by the camera 132 (e.g., through the use of a vision system). The frame sensing module 150, once the frame 110 is identified to be in the space above the base station 120, acts to compute a pose 166 of the frame 110 and/or UAV 104. The landing module 154 may then transmit a first set of control signals 145 to the UAV 104, including the determined UAV pose 166, to guide the UAV 104 to a pre-landing position or hovering position above the receiving assembly 130. The landing module 154 (with assistance from the frame sensing module 150, in some cases) then monitors movement of the UAV 104, such as by further processing of the images 133 from the upward-facing camera 132, until the UAV 104 has reached the pre-landing position 164 (or an X-Y-Z position within a range of acceptable positions) above the receiving assembly 130. Once reached, the landing module 154 transmits a second set of signals (or a single signal) 147 to the UAV 104 to cause the UAV 104 to reduce or lower its thrust and allow itself to be slowly lowered downward onto the receiving edges/surface 172 of the sidewalls 170 of the receiving assembly 130.

The receiving assembly 130 of the base station 120 is shown to include one or more sidewalls 170 that can be oriented vertically (or substantially so) and arranged to define opening or exposed enclosure or pen, where the upward-facing camera 132 can be positioned. Each of the sidewalls 170 includes an upper and exposed edge or receiving edge/surface 172, and these edges/surfaces 172 are sloped or provided at an angle to provide gravity feeding of a received frame 110 into grooves or slots (lowest points) 174. Particularly, a groove or slot 174 is provided in the sidewalls 170 for receiving each portion of the arms 112 that extends outward from the center line/point of the frame 110, e.g., there may be two elongated arms 112 in the frame 110 that provide four extending arm portions and, in such a case, there would be four grooves or slots 174. The slope or angle 173 of the receiving edges or surfaces 172 may be chosen to provide a gradual and gentle sliding of the frame 110 and UAV 104 under the force of gravity such as 10 to 45 degrees toward the slot or groove 174 between adjacent pairs of the receiving edges 172 (at the opposite end of each receiving edge or surface 172 two adjacent pairs of the edges 172 will meet at a point or highest point of the receiving surface with the alternating valleys (with slots/grooves 174 at lowest points) and points/peaks or highest points causing the receiving assembly 130 to have the appearance of a crown).

When the arms 112 of the frame 110 contact the receiving edges/surfaces 172 of the sidewalls 170, the arms 112 slide downward along the edges/surfaces 172 until they reach the grooves/slots 174. At this point, the arms 112 may fall an additional vertical distance to the bottom of the grooves/slots 174. Specifically, each slot or groove 174 may have a width that is greater than the diameter (or outer dimension) of the arms 112 (e.g., a groove/slot width that is 1 to 2 times the arm diameter) and have vertical or steeply sloped sidewalls with a relatively short height (e.g., a groove or slot height that is 2 to 4 times the arm diameter), and the slots or grooves 174 may generally be "V" or "U"-shaped.

In or near the grooves/slots 174, there are charging contacts 190, as shown at 191, which mate with incoming charging contacts 116 as shown at 117 of the received portion of the arms 112. The charging of the battery 108 may then proceed by operation of the electrical power supply 194 to provide via line/connector 195 power to the charging contacts 190. To enhance the electrical connection and to retain the UAV 104 securely and safely within the receiving assembly 130 during recharging, the receiving assembly 130 may include a locking mechanism or assembly 180. The mechanism 180 may include a frame presence sensor(s) 182 that functions to determine when an arm 112 has been received within a groove/slot 174. In response, the locking mechanism 180 may function to operate a set of actuable locking elements 184 to lock the arms 112 within the grooves/slots 174 until charging is complete and the UAV 104 is about to take off from the receiving assembly 130. Hence, the locking mechanism 180 may be controlled by the controller 142 to initiate locking and/or to initiate unlocking of the locking elements 184. The locking elements 184 may include a pivotal lever or beam that moves from a retracted position allowing the arms 112 to move through the grooves 175 to an extended or engaged position. In the engaged position, the lever or beam would be rotated or pivoted such that a portion moves into or across the expanse of the groove or slot 174 so as to block movement of the arm 112 out of the groove/slot 174. In some cases, the locking elements 184 also contacts the arms 112 to push or force the arms 112 further down into the grooves/slots 174 so as to increase the contact force and/or contact area between the charging contacts 190 and the incoming charging contacts 116 on the arms 112. It will be understood that many other designs for the locking system may be used to implement the present invention.

Figure 2:
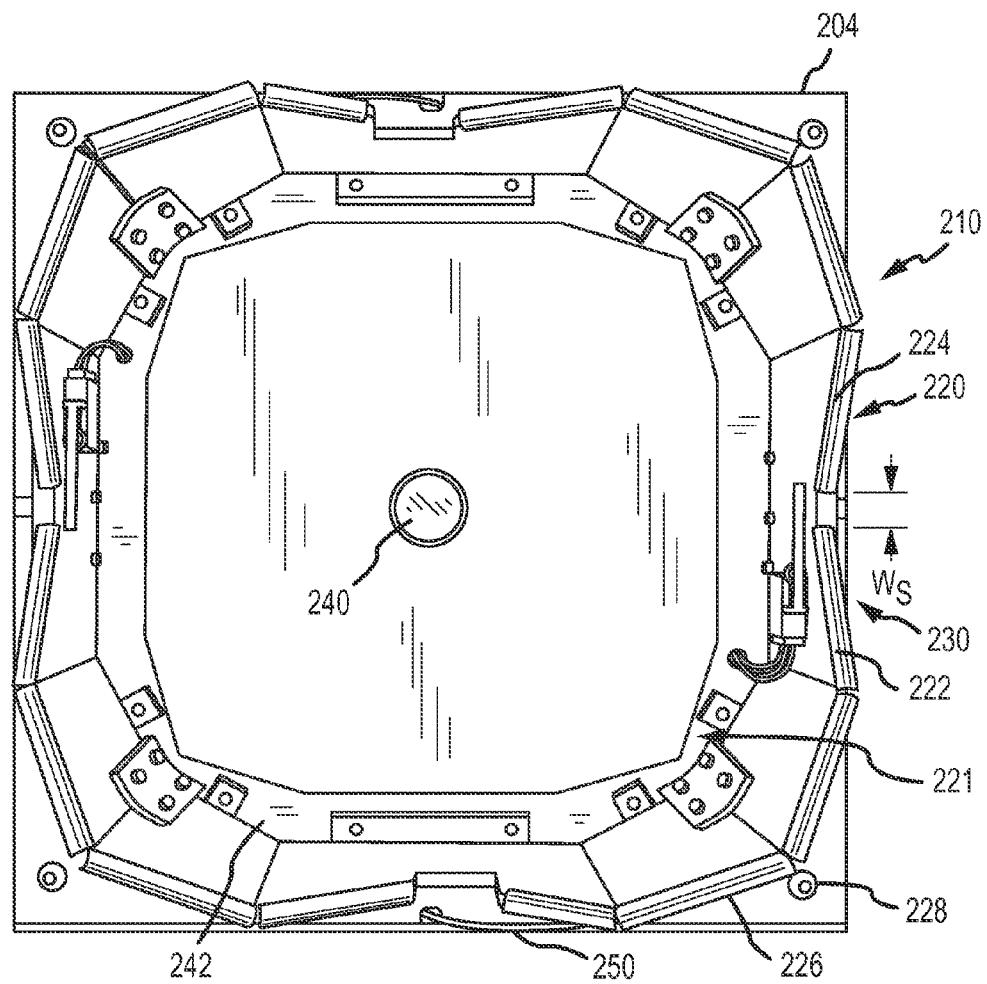
FIG. 2 is a top view of a receiving assembly for use with a docking or base station of the present description such as with the base station of FIG. 1 and showing the crown pattern (or peak and valley arrangement) of upper edges of sidewalls along with receiving slots or grooves for a station-mating frame on a landing UAV and an upward facing camera.
Figure 3:
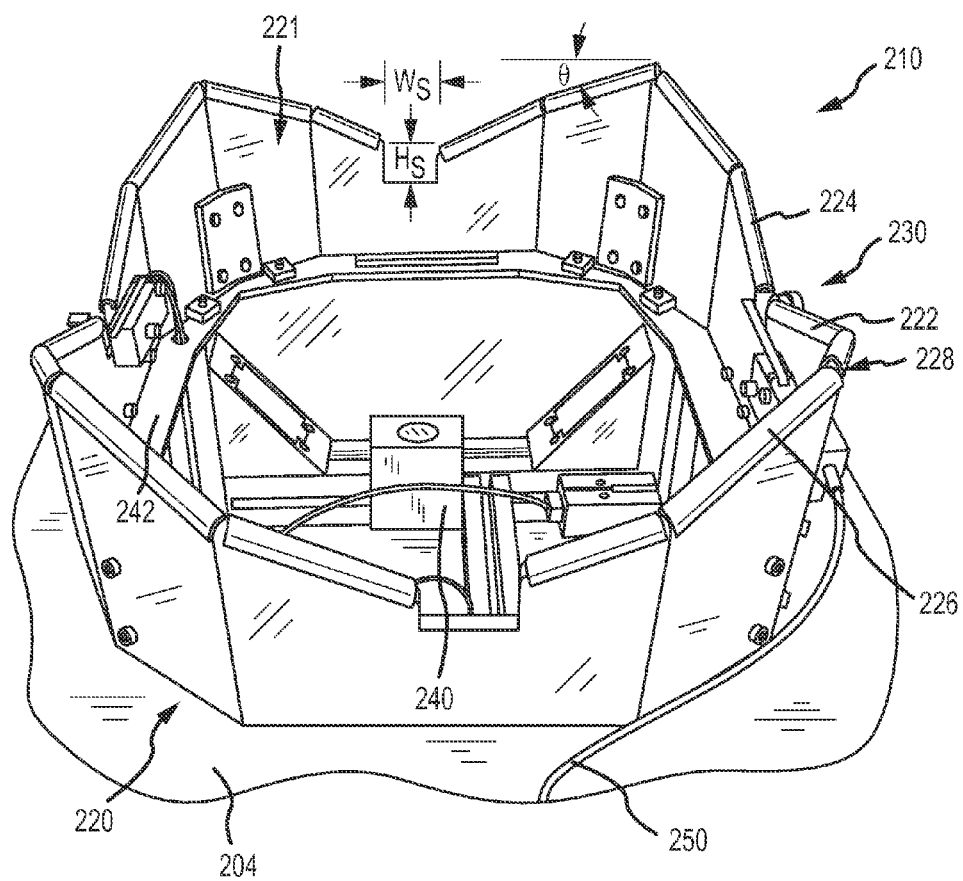
FIG. 3 is a side perspective view of the receiving assembly of FIG. 2.

FIG. 2 is a top view of a receiving assembly 210 on a support platform 204 (e.g., a platform that may be mounted on a lamppost or other support on or above the ground). The receiving assembly 210 is adapted for use with or as a docking or base station of the present description such as with the base station 120 of FIG. 1. FIG. 3 is a side perspective view of the receiving assembly 210, and FIGS. 2 and 3 are useful for showing the crown pattern (or peak and valley arrangement) of upper edges of sidewalls of the station 210 along with receiving slots or grooves for a station-mating frame on a landing UAV and an upward facing camera.

As shown, the receiving assembly 210 includes a plurality of adjoined sidewalls 220 affixed to the platform 204 to be vertical (when the platform 204 is held horizontally) and define a perimeter that may be circular to rectangular in shape and defines an open interior space or volume 221. The sidewalls 220 have exposed receiving edges or surfaces 222, 224, 226 adapted for providing landing surfaces for a station-mating frame on a UAV. The edges or surfaces 222, 224, 226 of the sidewalls 220 may be smooth and curved in shape to reduce friction between the frame's surfaces and the sidewalls 220, and, in some cases, a smooth plastic, metal, or other material rail may be attached on top of the sidewalls 220 to provide the receiving surfaces 222, 224, 226.

Between some of the adjacent pairs of receiving surfaces such as surfaces 222 and 224, receiving grooves or slots 230 are provided such that a frame arm sliding under gravity down the receiving surfaces 222, 224 will be received into and fall to the bottom of such grooves/slots 230. The slots 230 may each have a width, $W_S$, and a height, $H_S$, to allow an arm of a frame on a UAV to be fully received and captured for charging (with wire/line 250 interconnecting a power supply (not shown) and charging contact(s) of the receiving station 210 provided in or near a slot/groove 230 (shown in detail in FIG. 5)) and for retention by a locking mechanism (see FIG. 5 for more detail on these two components). These dimensions may vary and are selected to suit a particular frame design. In one embodiment, the width, $W_S$, was chosen to be in the range of 1 to 2 times that of the width/diameter (e.g., outer dimension) of the arm of the frame while the height, $H_S$, was chosen to be in the range of 2 to 3 times that of the arm width/diameter. Typically, each slot 230 will be tightly mated with the received arms (e.g., to nearly provide a plug-in fit). The walls of the slots/grooves 230 may be vertical as shown or these too may be sloped or slanted to further guide a received arm of a frame to a particular charging position.

To achieve this gravity feeding or forcing function of the receiving assembly 210, the receiving surfaces or edges 222, 224, 226 are each provided at a slope or angle, θ, as shown in FIG. 3 that is measured from horizontal plane including a peak 228 between adjacent receiving surfaces (such as surfaces 222 and 226) and the receiving surface 222, 224, or 226 (note, the receiving surface may be provided as a single piece element with one angle toward the slot/groove or as a two or more-piece element with two or more such slopes/angles downward into the slot/groove). In some embodiments, the slope or angle, θ, of the receiving surfaces or edges 222, 224, 226 is selected to be in the range of 10 to 45 degrees or more typically in the range of 15 to 35 degrees to provide a more gradual or gentle "drop" into the slot/groove 230 by a frame arm and the attached UAV. The distance between peaks (or the width of a valley) 228 can be selected to provide a tolerance on the pose (amount of rotation) of a landing UAV such that the arms of the frame do not have to land upon a slot or groove but can, instead, land several inches from the slots 230. For example, the valley width of the receiving assembly 210 may be 1.5 to 3 feet or more (e.g., depending upon the size of the UAVs and other factors).

As further shown in FIGS. 2 and 3, the receiving assembly 210 includes an upward facing or directed camera 240. The camera 240 may take the form of a monochromatic camera in some embodiments, and the camera 240 can be mounted within or under a covering platform 242 in the interior space/void 221 defined by the sidewalls 220. Particularly, the camera 240 may be mounted at a central location such as with its lens aligned with a center axis of the receiving assembly 210 (or of the perimeter defined by the receiving surfaces or edges 222, 224, 226) or at an offset to such a center line that is known to a processing module that determines a location of a hovering UAV relative to the receiving assembly 210. The lens of the camera 240 is exposed and directed vertically upward to capture images of the sky or space above the receiving assembly 210, and the camera 240 is mounted to be at a height within the assembly 210 such that a landing UAV and its frame (when received and locked in the slots/grooves 230) is above and spaced apart from the camera 240.

Figure 4:
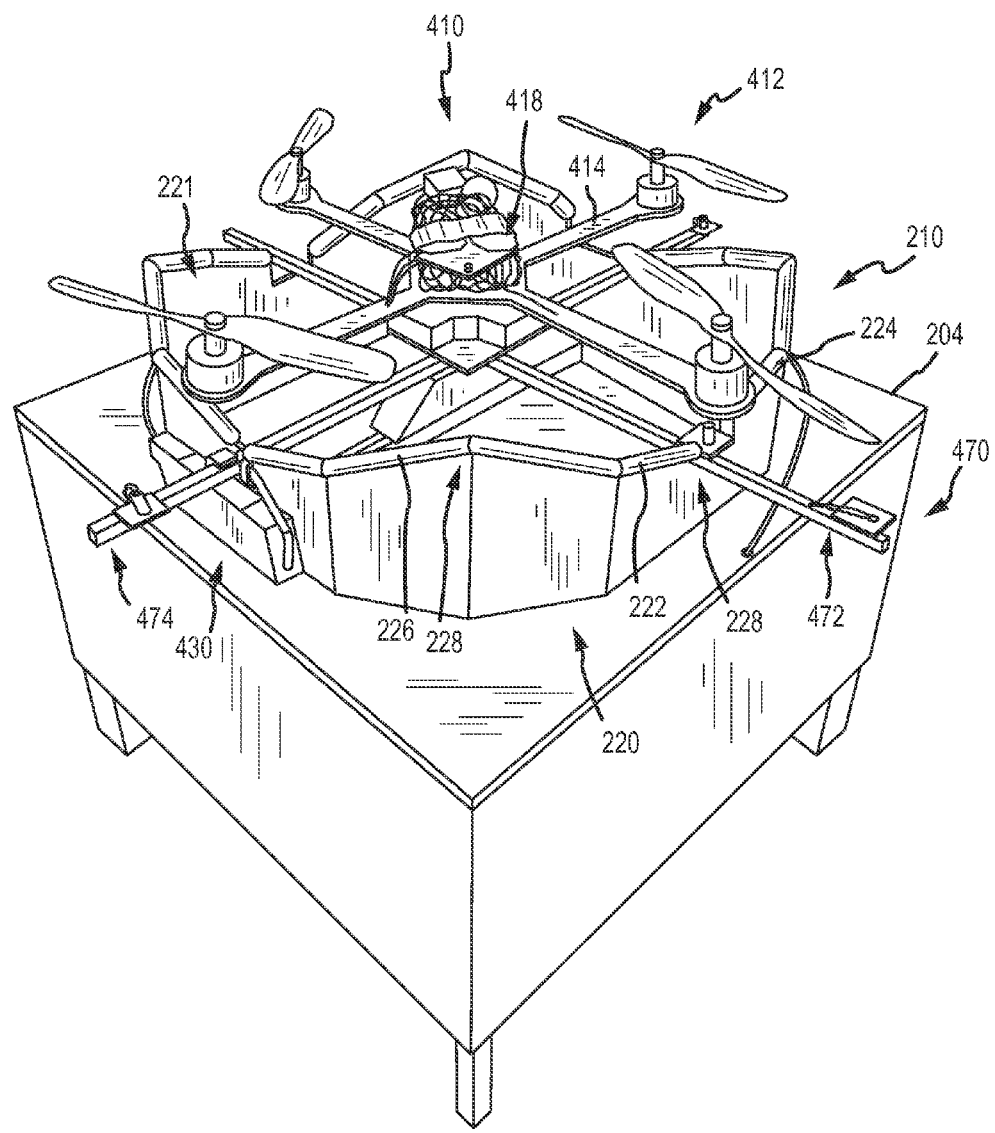
FIG. 4 is another side perspective view of the receiving assembly of FIGS. 2 and 3 with a quadrotor carrying a station-mounting frame received and locked within the assembly.

FIG. 4 illustrates the receiving assembly or reception unit 210 with a UAV 410 in the form of a quadrotor locked into a charging position. As shown, the quadrotor 410 includes a center body/frame 418, and four rotors 412 are provided on rotor arms/supports 414 that extend out (in an orthogonal or crossed manner relative to each other) a distance from the body/frame 418 (e.g., 8 to 24 inches from the body 418 or the like). As shown, a station-mating frame 470 has been mounted onto the lower side/portion of the body 418. The frame 470 includes two linear arms 472, 474 that cross at about the center line of the frame 470, which coincides with the center line of the quadrotor body's center axis or center line. Each arm 472, 474 has two portions that extend a distance out from the body's center axis a distance or length (or the frame 470 may be thought of as being formed with four arms meeting at the center line or axis of the frame 470), and the arms 472, 474 may be aligned to be parallel with the axes of adjacent rotor support arms 414. The arms 472, 474 may be hollow to be lighter weight but also to allow electrical lines/wires to be run through the open space within their bodies including lines to incoming charging contacts mounted on the arms 472, 474, e.g., at portions of the arms 472, 474 that are received within the slots/grooves 230 (when the charging contacts of the receiving assembly 210 are provided in or near the slots/grooves 230).

The arms 472, 474 may have an overall length (measured tip-to-tip) that provides some tolerance on the landing of the quadrotor 410 and its frame 470 on the receiving station 210. For example, the quadrotor 410 may not be perfectly centered above the receiving station 210 when it lowers itself downward onto the receiving surfaces 222, 224, 226, and it is desirable that this not result in the frame 470 missing one or more of the receiving surfaces 222, 224, 226 (which would cause the frame 470 to not be guided into the slots/grooves 230). To this end, the overall length of each arm 472, 474 may be greater than a width of the space or void 221 of the receiving station 210 as measured from oppositely located grooves or slots 230. For example, the overall arm length may be 6 to 24 inches greater than the groove-to-groove distance to allow for a landing quadrotor 410 to be off center during landing.

In FIG. 4, the arms 472, 474 of the frame 470 have slid down the receiving surfaces 222, 224, 226 and have been fallen into or been received within the receiving slots/grooves 230. Further, a locking mechanism 430 provided for two or more of the grooves/slots 230 has been actuated or operated to engage the arms 472 and/or 474 to retain the frame 470 and coupled quadrotor 410 in the receiving assembly 210 and, in this embodiment, to force or urge a charging contact on the arm 472 and/or 474 into fuller electrical or mating contact with a charging contact of the receiving assembly 210.

Figure 5:
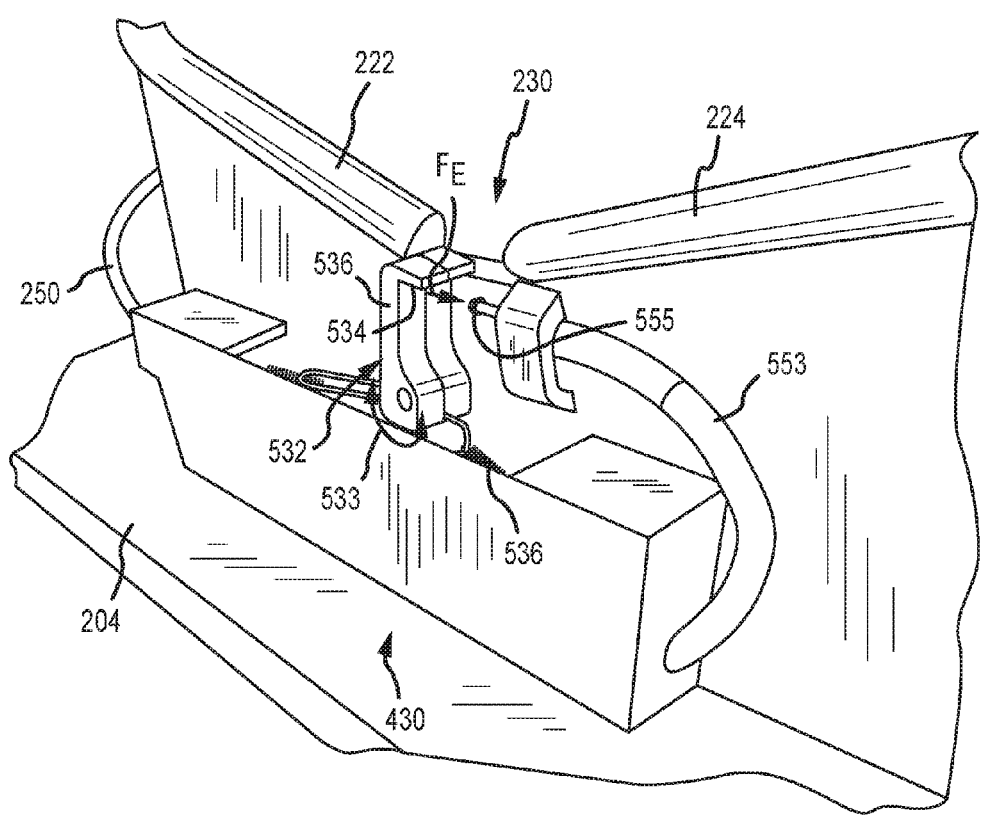
FIG. 5 is an enlarged view of the receiving assembly of FIGS. 2 and 3 showing details of one of the receiving slots/grooves illustrating a locking mechanism in the engaged position and showing a charging contact of the receiving assembly extending into the receiving slot.

FIG. 5 illustrates an enlarged view of the receiving assembly 210 showing details of the assembly 210 near or within a receiving groove/slot 230, with the quadrotor 410 of FIG. 4 removed to better illustrate design details. As shown, the receiving assembly 210 includes a locking mechanism 430 that is attached to the platform 204 proximate to and adjacent the receiving slot or groove 230. The locking mechanism 430 includes a pivotal hook or hanger 532 that is selectively positionable, as shown with arrow 533, between a retracted or disengaged position and the illustrated engaged position. In the engaged position shown, a protrusion or lip 534 of the hanger 532 is positioned between the frame arm received in the slot 230 and the opening of the slot 230 to retain the frame arm within the slot 230. Again, it should be understood that the illustrated locking mechanism 430 is exemplary only and many other locking systems or mechanisms may be used to implement the receiving assembly 210.

Also, in the engaged position shown, the body 536 of the hanger 532 applies an engaging force, $F_E$, against the body of the received frame arm causing the arm to move into or more fully into contact with the charging contact 555. Spring element(s) 536 may be used to facilitate positioning of the locking hook/hanger 532 in the engaged position and/or disengaged position (and actuation may be in response to a sensor sensing presence of the frame arm in slot 230 or via mechanical devices). The locking mechanism 430 may take the form of a servo-based locking system in some embodiments.

The charging contact 555 may have a copper (or other conductive material) body with a shape and size suited to mate with the incoming charging contact on the frame arm to be received in the slot/groove 230. For example, the contact 555 may be planar when the arm contact is planar or it may be a male fitting (or female fitting) when the arm contact is a female fitting (or male fitting) as shown in FIG. 5, and, in this manner, the station-mating frame of the UAV is "plugged into" the station 210 for recharging of the UAV's onboard rechargeable battery (or batteries). Without use of the locking mechanism 430, the two contacts including contact 555 may partially engage allowed charging to be achieved but a fuller contact may be achieved with use of the locking mechanism 430 and application of the engaging force, $F_E$, by the body 536 of the mechanism 430 (e.g., go from about 40 to 60 percent charging efficiency to 90 to 100 percent charging efficiency with the use of the locking mechanism 430). The charging contact 555 is linked to a power supply (such as supply 194 in FIG. 1) via lines 250 and 553.

As can be seen from FIGS. 1-5, the physical docking or base station is designed to be compact, weather resistant, and relatively simple to manufacture and maintain. The base or docking station includes: (a) a compact framework with a desired amount of weather resistance; (b) a "crown" shaped receiving surface made up of alternating peaks and valleys (with grooves/slots at the valley bottoms) specifically designed to passively (via gravity) correct multicopter landing imprecision; (c) a locking system, which may be composed of servo locks and micro switches, that ensures physical retention and positioning of the multicopter during charging operations; (d) a charging system composed, in some examples, of copper-to-copper contacts (on or near one or more of the grooves/slots and one or more on or extending from the arms of the station-mating frame); (e) an upward-facing monochromatic camera for capturing images of received light (IR radiation from IR LEDs, with all non-IR radiation being filtered out in some cases) from light sources arranged in a predefined pattern on the frame on a multicopter; and (f) a CPU unit (or base station controller) for the vision system (frame sensing module, landing module, and the like as shown in FIG. 1), communications, and the locking system control. The docking or base station is unique at least because it includes a crown or passive-correcting mechanism using only gravity to correct multicopter imprecision of up to about 45 degrees and/or 5 centimeters. The station is also unique in that it uses an on-the-ground vision system (camera and processing modules) that reduces the system's complexity and price, reduces the multicopter's payload (e.g., the camera is not on the multicopter or its frame), and provides or supports multiplatform capabilities.

Now, turning to the vision system and processes (e.g., process carried out by the controller 140 using the frame sensing and landing modules 150, 154 and camera 132), the pose estimation is designed to be robust against disturbances but also to be efficient. For better detectability, infrared LEDs may be used to allow the base station to determine when a multicopter is overhead. The IR LEDs may be attached to the station-mating frame in an asymmetrical pattern (asymmetric to allow the "front" of the multicopter to be identified), and this made it relatively easy but reliable to extract the pattern from an image that may include many disturbances (e.g., solar and other light may be present in the space/sky above the base station). The frame sensing module may use an image masking technique to drastically reduce the amount of disturbances in the image. Further, implementation of a Kalman-based tracking algorithm by the base station controller can be used in some implementations to allow a pose estimation even when part of the LED pattern on a frame is occluded or out of the camera's field of view.

In one prototyped implementation, the vision algorithm was created using the Robot Operating System (ROS) and ran on a Linux-based computer. The camera was a Point Grey Firefly MV providing a monochromatic image and ran with the pose extractor algorithm at 30 Hertz.

Figure 6:
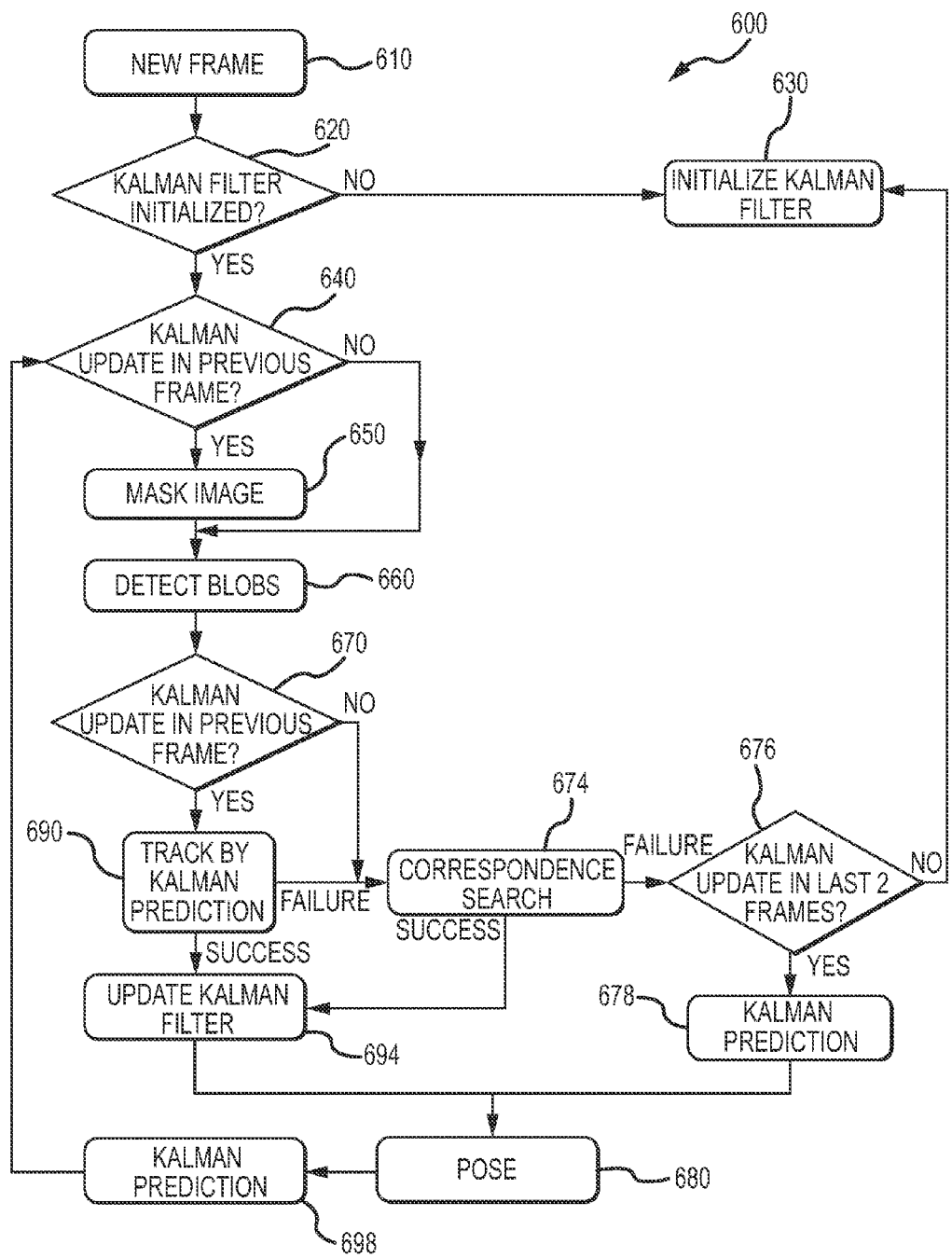
FIG. 6 is a flow diagram for a vision (or frame sensing and pose determination) method of the present description such as may be carried out by the frame sensing module of FIG. 1.

The frame sensing and pose extraction method 600 is shown and summarized in FIG. 6. For each call, the pose estimation 600 starts with a newly acquired image frame 610 (from the upward facing camera of the receiving assembly). At 620, the method 600 involves determining whether or not the Kalman Filter has been initialized. If it was initialized and if at 640 it is determined to have been updated with the detection of at least four non-co-linear LEDs, then the predicted positions of the LEDs are used at 650 to apply a mask or mask image, which improves the robustness of the LED detection such as by blacking out non-IR radiation including solar noise. If not initialized or after use of the mask at 650, the method 600 continues at 660 with detecting blobs within the received image/frame 610.

At 670, the method 600 includes determining if a Kalman update was provided in the previous frame. If "yes", the method 600 continues at 690 with using the KF to predict the area in which to search for the LEDs. If this step is unsuccessful (or an update was not in the prior frame), the method 600 includes performing a correspondence search at 674 to try to extract a valid configuration of LEDs from the image/frame 610. If this is unsuccessful, the method 600 continues at 676 with a determination of whether an update has been performed in the last two frames. If not, the method 600 proceeds with initializing the Kalman Filter at 630. If yes, a Kalman prediction is provided at 678 for use in pose determination at 680. If step 690 is successful, the method 600 continues at 694 with updating the Kalman Filter. Then, at 680, a pose is determined, from the current state vector of the Kalman Filter, by extracting a 6 degree-of-freedom pose using the perspective N-point algorithm (PnP). The pose message can then be formed by the base station controller and sent wirelessly to the quadrotor to control its positioning above the base station's receiving assembly and landing on its crown-shaped receiving surfaces. The method 600 may continue at 698 with the pose from step 680 being used to provide a Kalman prediction.

Figure 7:
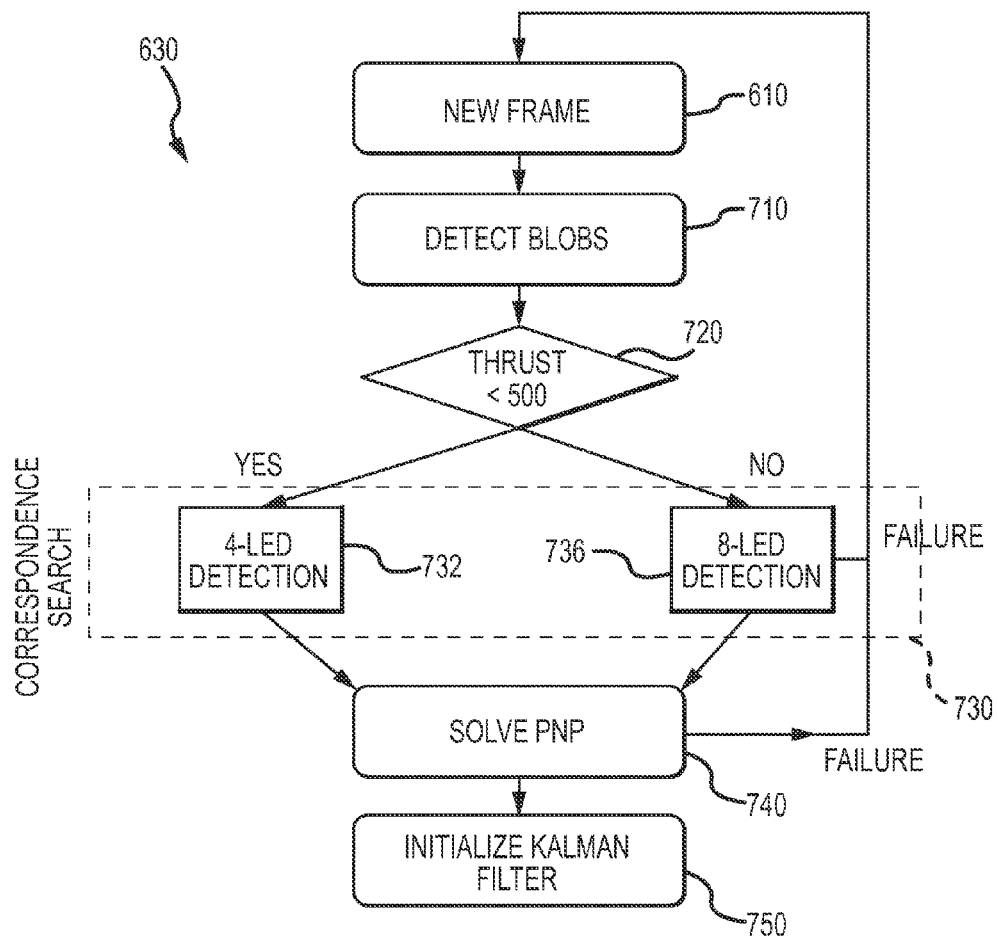
FIG. 7 illustrates a flow diagram for the steps for initializing a Kalman Filter as part of the method or process of FIG. 6.

FIG. 7 illustrates a flow diagram for a method of initializing 630 a Kalman Filter (e.g., search/KF initialization) for use with the method 600 of FIG. 6. For each new frame 610, bright points or blobs are detected at 710, which may involve extracting the points/blobs from the image and forming a new binary image. At 720, the initialization may use a thrust threshold (such as a thrust of 500) to determine how to perform a correspondence search 730. If below the thrust threshold, the search 730 may use at 736 the original predefined pattern (e.g., an 8-LED configuration was used in one prototyped frame and vision system but other numbers of light sources and patterns may be used). If greater than the threshold, the search 730 may use at 732 a subset of the original predefined pattern (e.g., a 4-LED subset when 4 LEDs of the 8 LEDs on the frame are visible). The second possible correspondence at 732 is visible, for example, when the quadrotor carrying the station-mating frame is in the landing dock (in the grooves/slots of the crown-shaped receiving surfaces of the receiving assembly) and coincides with the first system boot/reboot or in the case where tracking was lost during the final stages of landing. With the correspondence search 730 completed, the initialization 630 continues at 740 with solving the PnP, and then at 750 with initializing the Kalman Filter using the solved PnP.

During prototyping by the inventors, two possible implementations were used. The first simultaneously searched for a 4-LED configuration or pattern and an 8-LED configuration or pattern. The second chose a thrust threshold value to distinguish or choose between the two search algorithms (as shown in FIG. 7). Both correspondence search algorithms were carried out using protective geometry to verify that the configuration/predefined pattern of LEDs matches that carried by the quadrotor on its station-mating frame.

In some implementations, projective invariance (invariance to angles (e.g., oblique angles)) is provided by arranging the LEDs along two straight lines that cross and are orthogonal to each other. This may be provided by using a station-mating frame with two elongated arms that are arranged in a regular cross (the linear axes of the frame arms are orthogonal to each other), and the LEDs may be arranged on these two arms (in two bars) to provide projective invariance in the identification or searching for the predefined pattern in the image received from the upward facing camera of the receiving assembly. The LEDs are also arranged in an asymmetric pattern to give orientation of the frame (e.g., pattern helps identify which arm of the frame is paired with a front or rear portion of the quadrotor). The patterns of the LEDs may be identical for all quadrotors or, in some cases, the pattern may be unique to each or some of the quadrotors to allow individual quadrotors to be identified (e.g., by providing differing spacing between the LEDs on one or more of the frame arms), which may be useful for tracking use of differing quadrotors and/or having different quadrotors charged by different base stations.

Figure 8:
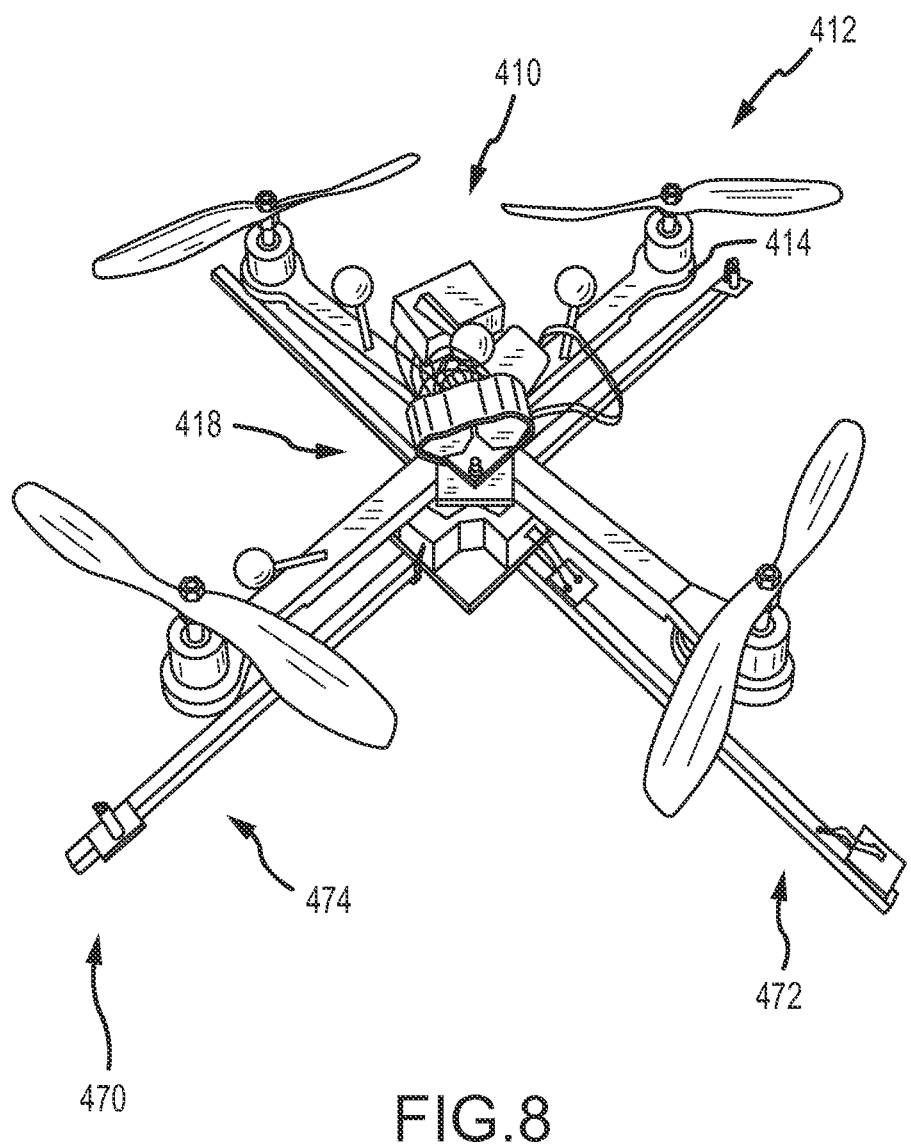
FIG. 8 illustrates with a top perspective view the quadrotor with station-mating frame shown in FIG. 4.
Figure 9:
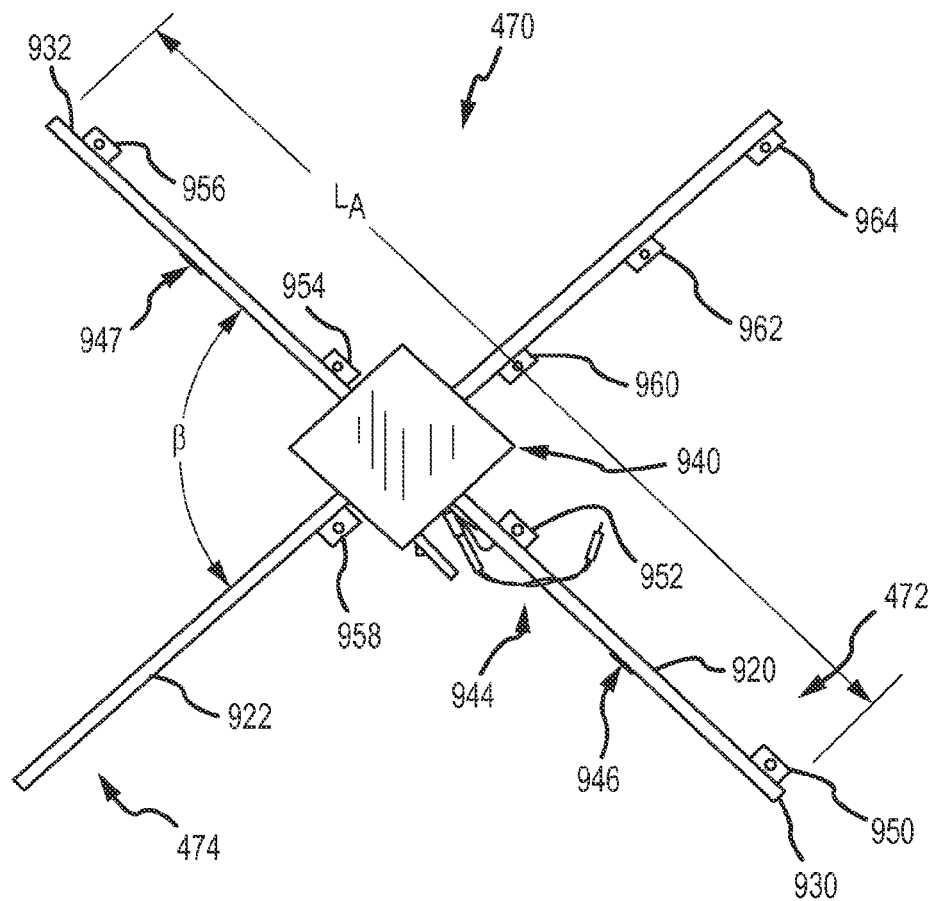
FIG. 9 is a bottom view of the station-mating frame of FIGS. 4 and 8 illustrating the light sources arranged in a pattern on the orthogonally-arranged or crossed arms of the frame.

FIG. 8 illustrates with a top perspective view the quadrotor 410 with the attached/coupled station-mating frame 470 as shown in FIG. 4. FIG. 9 is a bottom view of the station-mating frame 470 illustrating the light sources (e.g., LEDs) 950, 952, 954, 956, 958, 960, 962, 964 arranged in a pattern on the orthogonally-arranged or crossed arms 472, 474 of the frame 470. As will be appreciated from the prior description of the docking and charging system, another important component and unique feature of the system is the station-mounting frame 470 (which can be used "generically" with nearly any multicopter or other UAV). The purpose of the frame 470 is threefold: (1) the frame is used for the vision-based tracking system and provides an asymmetrical configuration or pattern of light sources (IR LEDs or the like); (2) the frame may be formed of a lightweight carbon or other material and replaces the landing gear of the multicopter so that the multicopter can land (with tolerance) on the receiving assembly; and (3) the frame contains the charging leads and contacts. An underlying motivation for the creation of the detachable frame 470 stems from the fact that the number of quadrotor and multi-rotor UAVs has exploded, and, therefore, the choice of a specific platform for each design or model can be extremely limiting.

As shown in FIG. 9, the frame 470 includes two linear bars or arms 472, 474 that are of equal length, $L_A$, in this implementation (as measured from tip/end 930 to tip/end 932). As discussed above, the length, $L_A$, is chosen to suit the base station and to provide some side-to-side landing tolerance such as by being 12 to 36 inches greater than an outer dimension of perimeter defined by the sloped receiving surfaces of the receiving assembly. The arms 472, 474 are crossed and meet at a center of the UAV-coupling element or plate 940, which is configured to be detachably mated with the lower portion or surfaces of the body 418 of the UAV 410 (e.g., attached at a central fastener common with most UAV models). The arms 472, 474 are to be orthogonal (i.e., the angle, β, is about 90 degrees) to facilitate ready identification of the frame 470 with projected invariance when light sources are arranged in a pattern on the arms 472, 474 along two crossing bars or lines.

To facilitate charging of a UAV battery, one or both of the arms 472, 474 may include one or more charging contacts that are positioned to be accessible by contacts in the receiving assembly and to be positioned along the arms 472, 474 at a location that assures contact-to-contact mating when the UAV 410 and 470 are locked into the grooves/slots of the receiving assembly. In the frame 470 shown in FIGS. 8 and 9, the arm 472 has a pair of charging contacts 946, 947 positioned on an external surface of the arm 472 (e.g., about midway or somewhat further out from the center of the UAV-coupling element/plate 940). These may be simple planar contact plates or female/male contacts suited for coupling with the charging contacts of the receiving assembly. Leads (not shown) may extend from the contacts 946, 947 within the hollow body 920 (or 922) of the arm 472 (or arm 474) to the element or plate 940. A lead or electrical connection line 944, which is connected to such leads, may extend out from the element or plate 940 for use in connecting to contacts of the rechargeable battery (or batteries) in the body 418 of the UAV 410.

A predefined number (e.g., 8 in this example) of IR LEDs (or other light sources) 950, 952, 954, 956, 958, 960, 964, and 968 are arranged on the arm bodies 920, 922 so as to direct light downward (away from the UAV body 418 and rotors 412 and, preferably, vertically downward such as along lines that are orthogonal to the plane containing the rotor supports 414 or the like). As shown, one LED 958 is provided on the portion of the arm 474 extending rearward outward from the body/plate 940 while three LEDs 960, 962, 964 are provided on the portion of the arm 474 extending forward outward from the body/plate 940 (with "forward" and "rearward" used to delineate a front and back of the UAV body 418 when the body/plate 940 is attached to the UAV body 418). Two LED pairs (LEDs 950 and 952 and LEDs 954, 956) are provided on the two portions of the arm 472 extending outward from the sides of the body/plate 940 and UAV body 418 when the frame 470 is attached to the UAV 410.

The configuration of the LEDs/light sources on the frame 470 is asymmetrical, with this example using 8 IR-LEDs placed as shown in FIG. 9. Using an upwards-facing camera leads to an increased amount of direct solar irradiance being in each captured image/frame. Since the solar irradiance is weaker in the infrared area, IR LEDs are expected to perform better than many other light sources that can be used in some cases. Analysis of both solar irradiance and camera sensor response properties led the inventors to the choice of a specific wavelength for one implementation of the frame 470. In this case, the IR LEDs were at 880 nm, and this led to a relative response of the image sensor that was 58 percent greater than another test case. Although the Kalman Filter only requires three points to update, using more markers (more LEDs/light sources in the pattern on the frame 470) provides for a more reliable extraction of the pattern from an image containing many disturbances. In order to maintain efficient tracking of a UAV 410 with the frame 470, an asymmetric pattern such as the one shown in FIG. 9 was employed by the inventors in a non-limiting implementation.

The docking and charging system described herein is fully autonomous and may be used for indoor and outdoor operations. Outdoor operations bring a multitude of complications including the presence of high-intensity light sources in the far background. The choice to implement an upwards-facing camera created the need for a new solution in order to identify the LED configuration or pattern on the frame of the multicopter in the presence of a strongly lit background. One proposed solution is a combination of specific LEDs (a predefined pattern of light sources on the frame) and minimal physical masking of the background to create a strong perceived contrast. The LED selection is based on the measured light spectrum at the surface of the Earth. Indeed, the inventors found that at 880 nm there is a drop in received wave intensity. On these grounds, an 880 nm infrared LED was used with satisfactory results on the frame 470.

At this point, it may be useful to discuss one method for providing control over the docking and recharging of a UAV on a base station of the present description such as the quadrotor 410 with frame 470 upon the receiving assembly 210 with FIG. 4 showing the docked, locked, and charging quadrotor 410. In one specific case, the quadrotor was an AscTec Hummingbird available from Ascending Technologies, and this quadrotor was equipped with two ARM-7 processors including a low-level (LL) processor used for attitude control and a high-level processor (HLP) that runs the autopilot of the quadrotor. The quadrotor includes an IMU, a triple axial compass, a differential pressure sensor, and a GPS unit.

The pose calculated by the visual pose extraction was sent directly to the quadrotor using the AscTec High Level Interface. The interface allows access to nearly all the system states, sensors, and parameters during flight. Along with the interface, there is high level firmware that includes a PID position controller. Using the AscTec SDK for the high level firmware, the inventors were able to implement a simplified control procedure using the AscTec position command, where the position used by the onboard system is that of the pose extracted by the vision system of the present description. The firmware also included a Luenberger Observer used as a state estimator running at 1 kHz.

Figure 10:
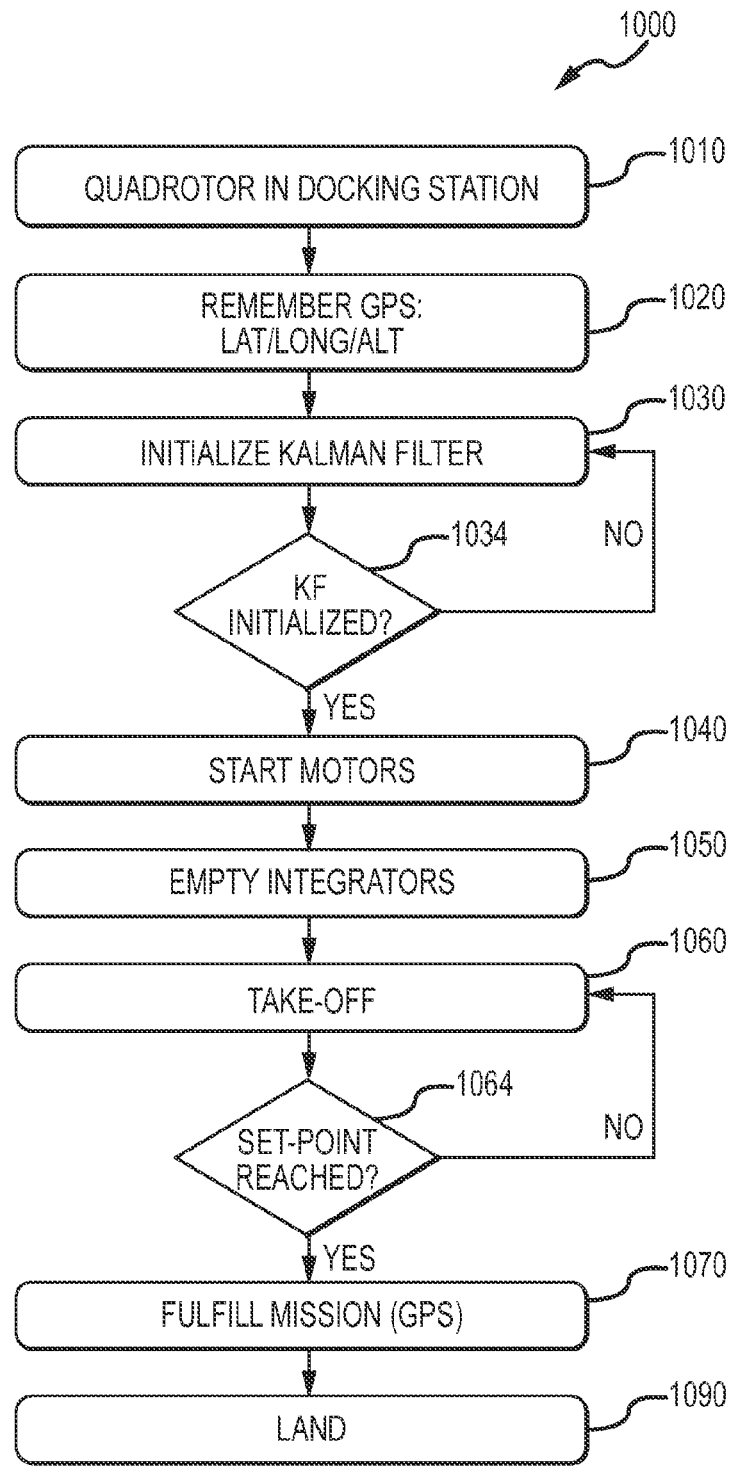
FIG. 10 is a flow diagram of an exemplary control method for using a docking and charging system of the present description with a quadrotor upon which a station-mating frame is attached.

FIG. 10 illustrates a flow diagram for one control method implemented with a docking and recharging system described herein. At 1010, the quadrotor is in the docking station with the arms locked in the slots by the locking mechanism for recharging (e.g., with the electrical contacts in the slots contacting the charging contacts in the arms of the frame on the quadrotor). At 1020, the control method 1000 continues with GPS coordinates of the docking station including latitude, longitude, and altitude being stored/remembered by the quadrotor's controller. At 1030, the method 1000 includes initializing the Kalman Filter of the docking station controller, and, at 1034, the method 1000 includes verifying that this has been successfully completed prior to the method 1000 continuing as shown in FIG. 10.

At 1040, the method 1000 continues with the docking station controller signaling the quadrotor controller to start the motors to cause the rotors to initiate flight. At this step 1040 or prior to this step, the docking station controller may signal the locking mechanism to disengage the locks being used to retain the frame arms in the slots/grooves of the receiving surfaces/edges (or sidewalls) of the receiving assembly to enable the quadrotor to takeoff. At 1050, the control method 1000 includes emptying integrators, and, then at 1060, the quadrotor proceeds with takeoff from the receiving assembly of the docking station.

The control method 1000 then continues at 1064 with a determination of whether a set point has been reached for takeoff to be accomplished. Once accomplished, the method 1000 continues at 1070 with the quadrotor controller navigating the quadrotor to perform a predefined and stored mission using its GPS. The mission at 1070 includes returning to a position (stored at 1020) above the receiving assembly of the docking station such as before the battery charge is below a particular level. At 1090, the method 1000 continues with the docking station controller, using the upward facing camera's captured image, to identify the frame above the docking station, to provide control signals to move it into position, to determine its pose, and to then signal the quadrotor to reduce thrust to cause it to land on the crown-shaped receiving surfaces/edges of the sidewalls of the receiving assembly. In the land step 1090, the arms of the frame contact the sloped receiving edges and slide under the force of gravity applied to the quadrotor and frame until the arms are received in and fall downward into the slots or grooves at the bottom of the valleys in the receiving surfaces. The locking mechanism then is actuated to engage the arms of the frame to lock the quadrotor in place for recharging of the onboard rechargeable batteries.

The docking and charging system(s) and method(s) described above have been proven to work effectively through a number of experiments, and, at this point in the description, it may be useful to provide a summary of some of these results. One experimental procedure investigated the following: (1) a quadrotor is placed in a receiving assembly of a docking station; (2) vertical takeoff is performed to a height of 1.2 meters; (3) the quadrotor performs a mission of hovering at position (0, 0, 1.2 meters) for 10 seconds; (4) the quadrotor is instructed by the base station, after frame identification via processing of an upward-facing camera, to vertically descend onto the receiving surfaces of the docking station; and (5) upon landing confirmation, the locking mechanism is engaged, charging is performed, and the system is shutdown. Some of the experimental difficulties included reducing lateral deviation from the z-axis, maintaining the system under vision control during aspects of the flight (e.g., no open loop operations), and extending the above operations to realistic flight conditions imposed by wind and background light. The system and method were evaluated by the number of successful. operations (takeoff and landing), by the maximum lateral deviation from the z-axis during aspects of flight (e.g., maximum deviation during departure, maximum deviation during approach, and error at landing), and by a set of visual 3D results.

With regard to experimental setup, numerical data was collected during a set of flights conducted in an enclosed and strongly lit room containing a Vicon MX optical motion capture system. The camera-based vision system described herein was initially compared to the Vicon data to determine overall accuracy. The results showed a high precision in the camera-based vision or tracking system, the data of a number of flights were recorded using the docking station's camera-based tracking system. The data was that of 60 flights of which 20 were conducted in no wind, 20 in 1.2 meters/second wind, and 20 at 2.2 meters/second wind. A fan was used to produce the fairly non-homogenous but realistic wind profile of which the average wind speed was measured at the position of the docking station and averaged over five points.

With regard to takeoff, the maximum variation from takeoff was extracted for each flight and was believed to give a good indication of the overall precision of the system at takeoff. The data for no wind and 2.2 m/s wind showed maximum variations from the z-axis in the range of −0.2 to +0.2 meters with confidence intervals of 90 percent or higher. The results are believed to show that the influence of wind was present but minimal, contributing to a variation of only a few centimeters. The most noticeable error was that of a general deviation along the positive x-axis. After multiple tests, the cause of this error was attributed to overall quadrotor balance as well as the initial position of the quadrotor in the docking station (e.g., the quadrotor was relatively sensitive to the position of its center of gravity during takeoff), and this imbalance is not only attributed to the center of gravity but also to the influence of four slightly different motors in the quadrotor. A second possible cause for error was likely due to the initial position of the quadrotor inside the docking station before takeoff. If the quadrocopter is offset by a centimeter in the frame of the camera for example, the immediate consequence is integrator wind up. At the time of takeoff, this may cause relatively radical corrections of the quadrocopter. However, one solution may be to initialize the camera frame so that the quadrocopter takes the position (0, 0, 0).

With regard to landing, as per takeoff; the maximum deviation from the z-axis was also found to be in the range of −0.2 meters to +0.2 meters. It was noted by the inventors that the approach procedure is very precise and robust in all the tested conditions. Indeed, the approach was more controlled than takeoff in most tests due to the fact that the quadrotor never required radical control changes as did some of the tests during takeoff.

During touchdown and locking, the touchdown points were confirmed to allow the arms of the frame to contact the receiving surfaces/edges of the receiving assembly on each of the four extending portions (e.g., without any "misses"). Also, the locking mechanism was verified by the experiments. For all 60 flights, the quadrotor landed within 7 centimeters of the set point, and the specifically-designed receiving assembly with its crown-shaped receiving surfaces/edges and slots/grooves (at the bottom of valleys between two adjacent peaks) passively corrected for any errors. Successful locking was achieved for all 60 flights, which then allowed successful recharging of the batteries of the quadrotors.

The results of the experiments indicate that the docking and charging system and method provide a more reliable and regular operation of a UAV such as a quadrotor than could be achieved with human-controlled flight of the UAV. The investigation of the effect of minimal wind showed no significant influence up to the maximum wind speed of 2.2 m/s. It would be safe to imagine operations in higher wind speeds of up to 4 m/s or higher. Furthermore, the effect of sunlight and perturbations encountered when using an upward-facing camera were strongly reduced by the choice of IR LEDs as the light sources on the frame (e.g., of 880 nm LEDs) and the use of a subsequent camera lens filter. The largest error factor seemed to be the overall balance of the quadrotor itself. The experiments also showed that the use of KF initialization provided a reasonable solution, although other methods may be used to provide frame identification by processing of the images of the upward-facing camera.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The concepts described herein enable reuseability across different multicopters in at least the following ways: (1) the station-mating frame is easy to attach to different models of multicopters using, for example, a standard mount point provided at the center bottom of most multicopter models; (2) on docking, the only physical contact is between the base station and the frame such that there is no issue with using the frame and base station with different designs of multicopters; (3) the system for localizing a multicopter as it approaches the base station only relies upon sensing of the station-mating frame, and, as a result, sensing and localization of the vehicle for guidance works in the same way across different multicopters; (4) a problem for recharging can be to make good contact with the base station's charging contacts (unless wireless charging is utilized within the base station as may be case in some embodiments), and, in the described docking and charging system, contact is made between the frame's charging contacts and the base station's charging contacts such that the step of making good contact happens in the same way across different designs or models of multicopters; and (5) sending wireless control signals from the base station to guide the multicopter on landing uses standard communication protocols and/or signals that are supported by most if not all multicopter designs.

It should be clear from the above description that landing of the quadrotor or UAV involves the quadrotor using the position information received from the ground station/controller to lower itself (e.g., not simply dropping) by gradually reducing thrust. The quadrotor or UAV may continuously adjust the thrust to make the landing as controlled and/or gentle as possible. The detachable frame described herein is not constrained to use with a particular quadrotor or UAV, and, hence, there typically is not a need to provide alignment of its arms/beams with features of the quadrotor. Further, there is no requirement that the arms or beams in the frame be orthogonal in all implementations.

The recharging method and overall system have reduced complexity compared with other recharging methods and station designs. This is achieved in part by totally separating the vision system (provided on the ground) and the control system (onboard the quadrotor or UAV). The vision system has the mission of robustly tracking the UAV. The position/pose is transmitted via wireless signals (that may be labeled "control signals" as they are processed or used to control the UAV, but, the control is provided locally). The UAV receives its own position information and then takes the required action to guide itself down into the docking station.

In general, the docking station or landing dock taught herein is reusable across different models of UAVs. Hence, the system is configured to guide a UAV to a landing dock, using a sensor in the dock and an attachable sensed target on the UAV. The sensor determines the relative position of the dock and the UAV, and the dock sends wireless commands to guide the UAV based on the relative position. The importance of such a system is: (1) existing systems for docking UAVs use a custom detection mechanism for each different model of UAV; (2) in contrast, the described system involves attaching a target to the UAV so that the dock and its sensing algorithm does not need to be modified for a new UAV because the UAV is fitted with the predefined target; (3) hence, the target can be designed to provide the required accuracy for docking; (4) the target can be designed to be visible even when the camera is pointing up at the bright daytime sky. With a unmodified UAV, the relative pose may be inaccurate if the UAV lacks distinct features, the forward direction of the UAV may not be evident if the UAV is symmetric, and the relative pose may be inaccurate if the bright daytime sky is behind the quadrotor so that the UAV silhouette or features are indistinct. The described system examples use IR LEDs to address these issues.

We claim:

1. A system for autonomous docking and charging of an unmanned aerial vehicle (UAV), comprising:

a docking station including a vertical sidewall extending about a perimeter of an open space and having a plurality of sloped receiving surfaces arranged in a pattern of alternating peaks and valleys; and a station-mating frame affixed to the UAV comprising a first linear arm and a second linear arm, wherein the first and second linear arms are coplanar and orthogonal, wherein the first and second linear arms each have a length greater than an outer dimension of the perimeter of the open space defined by the vertical sidewall, wherein a charging contact is provided on at least one of the first and second linear arms, and wherein a charging contact, linked to an electrical power supply, is provided in at least one of the valleys of the sloped receiving surfaces, whereby the charging contacts have an electrical connection when the first and second linear arms are received in the valleys of the sloped receiving surfaces.

2. The system of claim 1, wherein the sloped receiving surfaces are each provided at a slope angle of at least 15 degrees, whereby the UAV with the station-mating frame slides under gravity into the valleys when the first and second linear arms contact the sloped receiving surfaces.

3. The system of claim 1, further comprising a locking mechanism in the docking station adapted for retaining the first and second linear arms in the valleys of the sloped receiving surfaces and for urging the charging contact on the at least one of the first and second linear arms into contact with the charging contact in the at least one of the valleys of the sloped receiving surfaces.

4. The system of claim 3, wherein recessed grooves are provided at lowest points in the valleys for receiving the first and second linear arms, wherein the locking mechanism is actuable to retain the first and second linear arms within the recessed grooves, and wherein the charging contact in the at least one of the valleys of the sloped receiving surfaces is provided in the recessed grooves.

5. The system of claim 1, wherein the docking station comprises a camera facing upward from the open space enclosed by the vertical sidewalls, wherein the station-mating frame comprises a plurality of light sources arranged on the first and second linear arms in an asymmetric pattern, and wherein the docking station comprises a controller processing frames captured by the camera to identify the station-mating frame based on the asymmetric pattern of the light sources, and, in response, to communicate landing control signals to the UAV.

6. The system of claim 5, wherein the plurality of light sources are mounted in spaced apart and crossing lines on the first and second linear arms to allow the controller to process the frames with projective invariance.

7. The system of claim 5, wherein the plurality of light sources each comprises infrared (IR) light emitting diodes (LEDs) and the camera includes an IR filter filtering out ambient light.

8. The system of claim 7, wherein the landing control signals include a pose of the UAV determined based on an orientation of the asymmetric pattern in the captured frames and include a signal to reduce thrust when the UAV is tracked to a pre-landing position above the sloped receiving surfaces of the vertical walls.

9. The system of claim 8, wherein the UAV comprises a quadrotor and wherein the reduced thrust signal comprises instructions to reduce speed of motors on the quadrotor to allow the quadrotor to land or lower onto the receiving surfaces.

* * * * *

UNITED STATES PATENT AND TRADEMARK OFFICE
CERTIFICATE OF CORRECTION

PATENT NO. : 9,573,701 B2
APPLICATION NO. : 14/452819
DATED : February 21, 2017
INVENTOR(S) : Paul A. Beardsley et al.

It is certified that error appears in the above-identified patent and that said Letters Patent is hereby corrected as shown below:

On the Title Page

Item (73) delete "Disney Enterprises, Inc., Burbank, CA (US)" and insert therefor --Disney Enterprises, Inc., Burbank CA (US)-- and --ETH Zürich (Eidgenössische Technische Hochschule Zürich), Zurich, Switzerland--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*